United States Patent Office 2,888,436
Patented May 26, 1959

2,888,436
POLYFUNCTIONAL POLYMERIC PRODUCTS

James E. Pritchard, Bartlesville, Okla., assignor to Phillips Petroleum Company, a corporation of Delaware No Drawing. Application February 18, 1955
Serial No. 489,258

13 Claims. (Cl. 260—73)

This invention relates to polyfunctional polymeric products. In a further aspect this invention relates to oil resistant rubber. In a further aspect this invention relates to surface active agents. In a further aspect this invention relates to new compositions of matter prepared by reacting polymers of polymerizable heterocyclic nitrogen bases with aldehydes.

The following are objects of this invention.

An object of this invention is to prepare polyfunctional polymeric products. A further object of this invention is to prepare compositions which are useful as oil resistant rubbers. A further object of this invention is to prepare compositions which are useful as surface active agents.

Other objects and advantages of this invention will be apparent to one skilled in the art upon reading the accompanying disclosure.

I have discovered that polyfunctional polymeric compositions are obtained by the interaction of an aldehyde with a polymer of a methyl-substituted heterocyclic nitrogen base of the pyridine or quinoline series containing at least one vinyl group. Homopolymers and copolymers of vinylpyridines containing a methyl group in the 2, 4 or 6 position in the heterocyclic ring are preferred. The invention is also applicable to vinylquinolines containing a methyl group in the 2 and/or 4 positions and vinylisoquinolines containing methyl groups in the 1 and/or 3 positions. As an example of the reaction, treatment of such a polymer with formaldehyde results in the substitution of from 1 to 3 of the hydrogen atoms in a methyl group with methylol groups. With other aldehydes a similar reaction occurs. As a result of this reaction, a methyl-substituted vinylpyridine or vinylquinoline polymer is converted into a composition which contains hydroxy groups distributed at intervals throughout the polymer molecule. These hydroxy groups are capable of further reaction, as is well known in the art, and the products themselves are useful as will be seen by an examination of the examples in this specification.

In one method of preparing the compositions of this invention, a homopolymer or copolymer of a methyl-substituted vinylpyridine or vinylquinoline is treated with the aldehyde, generally at a temperature in a range of 100 to 400° F. The reaction is effected under sufficient pressure to prevent volatilization of the aldehyde and to maintain it in solution in the polymer. The aldehyde can be incorporated into the polymer by any suitable means. When the polymer is a solid, it is conventional to add the aldehyde to the polymer on a mill, with continued milling until a homogeneous mixture is obtained.

Another method comprises treating the latex of the polymer with the aldehyde.

The following are specific examples of this invention which illustrate methods of operation which I have found to be satisfactory.

Example I

A liquid 75/25 butadiene/2-methyl-5-vinylpyridine copolymer was prepared by emulsion polymerization at 50° C. in accordance with the following recipe:

| | Parts by weight |
|---|---|
| Butadiene | 75 |
| 2-methyl-5-vinylpyridine | 25 |
| Water | 180 |
| Sodium fatty acid soap | 5 |
| Mercaptan blend [1] | 20 |
| $K_2S_2O_8$ | 0.3 |

[1] A blend of tertiary $C_{12}$, $C_{14}$ and $C_{16}$ aliphatic mercaptans in a ratio of 3:1:1 parts by weight.

A conversion of 94 percent was obtained in 22 hours. Paraformaldehyde was incorporated into the liquid butadiene/2-methyl-5-vinylpyridine copolymer by stirring using a ratio of six parts by weight of the paraformaldehyde of the copolymer. The mixture was heated for 18 hours at 160° C. and a dark brown, viscous liquid was obtained. This material was used as a softener in a butadiene/acrylonitrile rubber (Perbunan) using the following compounding recipes:

| | Parts by Weight | |
|---|---|---|
| | I | II |
| Butadiene/acrylonitrile rubber | 100 | 100 |
| Carbon black (Philblack A) | 60 | 60 |
| Zinc oxide | 5 | 5 |
| Stearic acid | 1.5 | 1.5 |
| Sulfur | 1.5 | 2.0 |
| Benzothiazyl disulfide (Altax) | 1.5 | 1.75 |
| Softener | 10 | 30 |

The stocks were compounded, cured 45 minutes at 307° F., and physical properties determined. Results were as follows:

| | I | II |
|---|---|---|
| Unaged Samples: | | |
| Stress-strain properties at 80° F.— | | |
| 300% modulus | 1,565 | 715 |
| Tensile, p.s.i | 2,460 | 1,150 |
| Elongation, percent | 440 | 420 |
| Shore hardness | 60 | 48.5 |
| Swell, percent [1] | 56.8 | 79.7 |
| Extraction, percent [1] | 4.0 | 8.7 |
| 212° F. compression set, percent | 11.0 | 14.0 |
| T-R freeze point, °C | −30 | −30 |
| Cold compression set, percent [2] — | | |
| Relaxed 10 seconds | 96.7 | 96.1 |
| Relaxed 30 minutes | 97.4 | 96.4 |
| Compounded MS 1½ at 212° F | 29.5 | 16.5 |
| Softener incorporation time, minutes | 2.5 | 5.0 |
| Oven Aged 24 Hours at 212° F.: | | |
| Stress-strain properties at 80° F.— | | |
| 300% Modulus | 2,040 | 965 |
| Tensile, p.s.i | 2,635 | 1,350 |
| Elongation, percent | 370 | 395 |

[1] Immersed in 70/30 isooctane/toluene mixture 2 days at 158° F. and dried 3 days at 158° F.
[2] 35 percent compression for 22 hours at −35° F. in $CO_2$ cold box.

A sample of butadiene/acrylonitrile rubber compounded according to recipe I and cured in the same way except that no softener was added, had a compounded Mooney value (MS 1½) of 63.5.

Example II

A rubbery 75/25 butadiene/2-methyl-5-vinylpyridine copolymer was prepared in the same manner as given in Example I except that 0.5 part mercaptan blend was used instead of 20 parts and the polymer had a Mooney value (ML-4) of approximately 20. A 76.5 percent conversion was reached in 9 hours. It was compounded in accordance with the following recipes:

|  | Parts by Weight | | | |
|---|---|---|---|---|
|  | I | II | III | IV |
| Butadiene/2-methyl-5-vinylpyridine rubber | 100 | 100 | 100 | 100 |
| Carbon black (Philblack O) | 50 | 50 | 50 | 50 |
| Dibutyl carbitol formal (TP-90B) | 10 | 10 | 10 | 10 |
| Zinc oxide | 5 | 5 | 5 | 5 |
| Stearic acid | 1.5 | 1.5 | 1.5 | 1.5 |
| Sulfur | 5 | 5 | 5 | 5 |
| N-cyclohexyl-2-benzothiazole-sulfenamide (Santocure) | 1 | 1 | 1 | 1 |
| Paraformaldehyde | 6 | 6 |  |  |
| Benzyl chloride |  | 26 |  | 26 |

The compounded stocks were cured 30 minutes at 307° F. Samples were immersed in a 70/30 isooctane/toluene mixture at 25° C. for 48 hours and swelling and extraction determined. Shore hardness was also determined on the cured samples. Results were as follows:

|  | I | II | III | IV |
|---|---|---|---|---|
| Swell, percent | 85.5 | 38.0 | 308 | 148 |
| Shore hardness | 65 | 89 | 47 | 70 |

Example III

Butadiene/2-methyl-5-vinylpyridine copolymers were prepared by emulsion polymerization at 50° C. in accordance with the following recipe:

Parts by weight
Water _____ 180
Butadiene _____ 85
2-methyl-5-vinylpyridine _____ 15
Sodium fatty acid soap _____ 43
$K_2S_2O_8$ _____ 0.3
tert-$C_{12}$ mercaptan _____ 0.28-0.31

A series of runs was made and the polymers combined to give a product having a Mooney value (ML-4) of 62. The following time-conversion data were obtained on the several runs:

| Mercaptan, Part | Time, Hours | Conversion, Percent | ML-4 |
|---|---|---|---|
| 0.28 | 11.8 | 65 | 98 |
| 0.31 | 10.5 | 62 | 36 |
| 0.31 | 8.8 | 60 | 62 |
| 0.29 | 9.7 | 60 | 74 |
| 0.28 | 9.2 | 60 | 82 |
| 0.29 | 10.0 | 61 | 69 |

Portions of this blend were treated with, respectively, paraformaldehyde, benzyl chloride or benzal chloride, paraformaldehyde and benzyl chloride or paraformaldehyde and benzal chloride, one portion being untreated. The materials added were incorporated with the gum stocks by mill mixing and all the portions, including the control, were heated one hour at 307° F. These portions were tested for solvent resistance by immersing each of them in a mixed solvent containing 5 percent benzene, 20 percent toluene, 15 percent xylene, and 60 percent diisobutylene. After immersion for 48 hours at 25° C., percent swell and percent extracted were determined. The following results were obtained:

| Portion No. | Paraformaldehyde PHR[1] | Quaternizing Agent | | Swell, Percent | Extraction, Percent |
|---|---|---|---|---|---|
|  |  | Type | PHR[1] |  |  |
| 1 |  |  |  | ([2]) |  |
| 2 |  | benzyl chloride | 10.6 | 921 | 11 |
| 3 | 2.5 | do | 10.6 | 300 | 13 |
| 4 |  | benzal chloride | 13.5 | 149 | 11 |
| 5 | 2.5 | do | 13.5 | 229 | 4 |
| 6 | 2.5 |  |  | 184 | 3 |

[1] Parts per 100 parts rubber.
[2] Too high to measure; gelatinous mass.

Example IV

Poly-2-methyl-5-vinylpyridine was prepared by emulsion polymerization at 50° C. using the following recipe:

Parts by weight
2-methyl-5-vinylpyridine _____ 100
Water _____ 180
Sodium fatty acid soap _____ 5
$K_2S_2O_8$ _____ 0.3
Mercaptan blend [1] _____ 0.3

[1] As in Example I.

A conversion of 98 percent was reached in 20 hours. The product was a solid resin.

A mixture of the polymer and 40 percent aqueous formaldehyde solution, using approximately 6 parts by weight formaldehyde per part of polymer, was heated in a sealed pressure vessel for 15 hours at 140° C. At the completion of the reaction approximately 95 percent of the water was evaporated from the reaction product and the wet white solid was recovered. This wet product was dispersed in water to form solutions of the concentrations indicated in the following table wherein surface tension data (dynes/sq. cm.) for this material and for two commercial surface active agents are shown.

| Concentration in Weight Percent | Polymer | Aerosol MA[1] | Triton X-100[2] |
|---|---|---|---|
| 0 | 72 | 72 | 72 |
| 0.1 | 53 | 48 | 34 |
| 0.2 | 47 | 43 | 33 |
| 0.4 | 41 | 38 | 33 |

[1] Dihexyl ester of sodium sulfosuccinic acid.
[2] Alkylated aryl polyether alcohol.

In the production of surface active agents the pyridine derivative should comprise at least 80 percent by weight of the monomers polymerized to form the polymer. The homopolymer is quite suitable as shown by the above example.

While I have illustrated this invention by reacting the polymeric materials with formaldehyde, both aromatic and aliphatic, saturated and unsaturated aldehydes can be used in place of the formaldehyde. Specific saturated aliphatic aldehydes which can be substituted, include acetaldehyde, propionaldehyde, the butyraldehydes, the valeraldehydes, caproaldehyde, and nonaldehyde. Representative unsaturated aliphatic aldehydes include acrolein, crotonaldehyde, tiglic aldehyde, and propiolaldehyde. Dialdehydes, such as glyoxal, succinaldehyde, and adipaldehyde are also applicable. Finally, suitable aromatic aldehydes include benzaldehyde, the tolualdehydes, cinnamaldehyde, and the like. It is frequently more convenient to use paraformaldehyde or paraldehyde in place of formaldehyde and acetaldehyde.

In some instances, as shown in Example IV, the aldehyde can be used in the form of an aqueous solution. The preferred range for the amount of aldehyde used is 0.1 to 1 CHO radical per methyl group attached to the heterocyclic ring in the polymer. However, a greater amount, up to 6 or 10 mols, can be used if desired although it is seldom necessary to use over 3 mols per methyl group attached to the heterocyclic ring.

The polymers used as starting materials in my invention are homopolymers and copolymers of compounds having a structure selected from the group consisting of

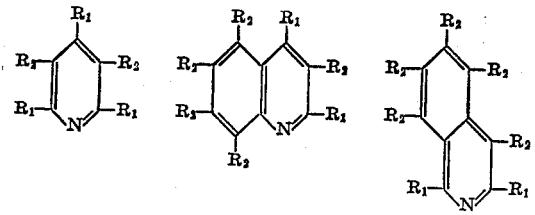

wherein $R_1$ and $R_2$ are, independently, selected from the group consisting of hydrogen, alkyl, vinyl, alpha-methylvinyl, nitro, alkoxy, halo, hydroxy, cyano, aryloxy, aryl, cycloalkyl, and combinations of these groups such as haloalkyl, alkylaryl, and hydroxyalkyl; and at least one $R_1$ being a methyl group. As is apparent from these structural formulae, the active positions for the methyl group are the 2 and 4 positions on the pyridine or quinoline ring, these being equivalent to the 1 and 3 positions on the isoquinoline ring. Also, as far as pyridine is concerned, the 6 position corresponds to the 2 position.

Specific examples of heterocyclic nitrogen bases which can be utilized for the preparation of polymers used in the practice of this invention are 2-methyl-5-vinylpyridine; 4-methyl-2,5-divinylpyridine; 2,3,4-trimethyl-5-vinylpyridine; 3,4,5,6-tetramethyl-2-vinylpyridine; 2-methyl-5-undecyl-3-vinylpyridine; 2,4-dimethyl-5,6-dipentyl-3-vinylpyridine; 2-methyl-3,5-di(alpha-methylvinyl)pyridine; 2-vinyl-3-nitro-4-methylpyridine; 2-methyl-5-chloro-5-methoxy-6-vinylpyridine; 2-vinyl-4-methyl-5,6-dichloropyridine; 2-vinyl-4-pentoxy-6-methylpyridine; 2(para-methylphenyl)3-vinyl-4-methylpyridine; 1,6-dimethyl-3-vinylisoquinoline; 2-vinyl-4-methylquinoline, 2-vinyl-3-benzyl-4-methylquinoline; 2-methyl-3-vinyl-5-chloroethylquinoline; 1-methyl-3-vinyl-6-hydroxymethylisoquinoline; 1-vinyl-5(hydroxyphenyl) 3-methylisoquinoline; and the like. Homopolymers of these polymerizable heterocyclic nitrogen bases can be used but, more usually, copolymers are used. Compounds containing an active $CH_2=C<$ group are suitable as comonomers. Examples of such compounds include styrene, substituted styrenes, such as alkyl, alkoxy, and halogen substituted styrenes; acrylonitrile; methylacrylonitrile; methyl acrylate; methyl methacrylate; ethyl acrylate; butyl acrylate; and conjugated dienes, such as 1,3-butadiene, isoprene, piperylene, methylpentadiene, 2,3-dimethyl-1,3-butadiene, chloroprene, and the like. Also, polymers can be prepared from various mixtures of the heterocyclic nitrogen bases and one or more of the comonomers set forth above. The preferred comonomers are conjugated dienes and, of these, 1,3-butadiene is the most widely used.

The heterocyclic nitrogen base component as set forth above is employed, as far as the broad scope of the invention is concerned, in an amount in the range of 2 to 100 parts by weight per 100 parts of monomers. While my work has shown emulsion polymerization to be preferable, mass or ionic polymerization systems are also suitable. The polymeric products can range from liquid to rubbery to resinous materials.

Following treatment with the aldehyde, a variety of polyfunctional polymeric products are available. These products range from liquids to rubbery materials to resins depending upon the nature of the polymers used as well as the type and amount of the aldehyde employed. In the case of homopolymers, treatment with an aldehyde, such as formaldehyde, usually yields thermosetting resins. However, if only a small amount of the aldehyde is used, it is possible to obtain a thermoplastic product. Likewise, when the polymeric material is a copolymer of the methyl-substituted vinylpyridine or vinylquinoline, treatment with an aldehyde yields either a thermoplastic or an infusible product depending upon the nature and amount of the comonomer employed as well as the amount of aldehyde used.

Examples I and IV of this disclosure are directed to situations in which the polymer is treated with an aldehyde alone. Examples II and III incorporate an additional feature of my invention wherein the polymer is treated with a quaternizing agent in addition to the aldehyde.

Quaternization of the nitrogen-containing polymers comprises the subject matter of my prior application Serial No. 248,448, filed April 25, 1952. As defined therein, quaternizing agents are compounds which react with the nitrogen base containing polymer to yield a product containing four nitrogen to carbon bonds on the nitrogen atoms in the recurring nitrogen base units of the polymer.

Quaternizing agents which are applicable for use in preparing the quaternized polymers utilized herein include the various alkyl halides, such as methyl iodide, methyl bromide, ethyl iodide, propyl iodide, hexyl iodide, nonyl bromide, cetyl bromide; the various alkylene halides, such as ethylene iodide, ethylene bromide, propylene chloride, butene bromide, octene bromide; the various substituted alkanes and cycloalkanes necessarily including the above alkyl and alkylene halides, which contain at least one hydrogen atom attached to a carbon atom, such as bromoform, chloroform, ethylene chlorohydrin, acetyl chloride, iodoform, chloroacetyl chloride; alkyl sulfates, such as methyl sulfate, ethyl sulfate, and the various substituted aromatic compounds, such as picryl chloride, benzal chloride, benzotrichloride, methyl benzene sulfonate. Other materials which can be employed as quaternizing agents in the practice of this invention include various polyhalogenated cycloalkenes, such as hexachlorocyclopentadiene. The foregoing enumeration is not intended to include all the possible suitable quaternizing agents, but is only representative, since many others can be used. Any organic compound which contains an active halogen atom attached to a carbon atom or contains a similar active quaternizing group and which is not an acid, is useful in my invention. In general, active quaternizing agents, such as organic halides, organic sulfates, and organic acid chlorides, and the like, which contain not more than 20 carbon atoms per molecule and contain at least on halogen or equivalent quaternizing group; for example, an alkyl arylsulfonate, an aryl alkylhalide, an alkyl sulfate, or the like, are satisfactory. Those compounds which contain the configuration

wherein X is a halogen atom, such as chlorine, bromine and iodine, and the R's represent oxygen, hydrogen or carbon valence linkages to their respective carbon atoms, are especially useful.

The reaction of a conjugated diene-heterocyclic nitrogen base copolymer with a quaternizing agent yields a product which contains characteristic nitrogen to carbon bonds in the recurring nitrogen base units of the polymers. In distinction, if the pyridine nucleus or portion of the copolymer were reacted with an acid acting substance (mineral acid, organic acid or the like), one of the two available nitrogen valences would be satisfied by a nitrogen to hydrogen bond and accordingly the product would not be a quaternized compound. The quaternary salts tend to be less water soluble than the unquaternized material whereas pyridinium salts formed by reaction with an acid acting compound (whereby a hydrogen atom attached to a nitrogen atom) tend to be more water soluble. Furthermore, the quaternizing reaction is readily controlled since it proceeds rather slowly, the reaction with an acid being very rapid. Quaternary salts are distinguished over the other pyridinium or quinolinium salts in that they are derived from strong bases. Also pyridinium or quinolinium salts (other than a quaternary salt) form free pyridine or quinoline, water and a salt when reacted with a strong base. Therefore, suitable quaternizing agents are those compounds which, when reacted with the nitrogen atom of the heterocyclic base nucleus, do not attach or link a hydrogen atom thereto. Expressed differently, the quaternizing agents of this invention are those compounds XY which react with the nitrogen atoms of the heterocyclic base nuclei of the copolymer or with a compound, such as pyridine or quinoline, to yield a material which may be characterized by the formulas

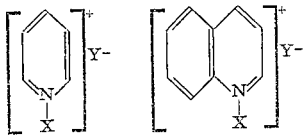

or

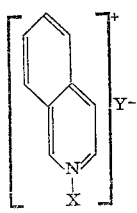

wherein X may be any molecular fragment, such as an organic radical, other than hydrogen, and Y is the remaining molecular fragment, such as an atom or radical (anion).

In the present invention, if the starting polymer is rubbery, the quaternizing agent and aldehyde are generally incorporated at the same time. If the polymer is a thermoplastic or a liquid material, the quaternizing agent and the aldehyde can be added simultaneously, as before, or the polymer can be reacted with the quaternizing agent first and then treated with the aldehyde. This latter method is frequently preferred because the reaction with the aldehyde is generally more rapid on the quaternized polymer than on the unquaternized polymer.

My invention provides a means for introducing hydrophilic groups into a polymer thereby increasing its oil resistance. This is brought out most clearly in Example II wherein the data show that the use of the aldehyde increases the oil resistance. Liquid polymers can be converted into solids by the process of this invention. A rubbery or liquid polymer can be readily converted into sponge rubber by treatment with formaldehyde which serves as a blowing agent and also causes the polymer to set.

The products herein described have numerous uses. They can be employed as potting compounds, as rubber softeners and tackifiers, as surface active agents, and as intermediates for the production of various types of materials. For example, they will undergo ester formation when treated with both inorganic and organic acids and the resulting materials can be employed as rubber softeners. It is possible to obtain products which might be designated as internally plasticized polymers by reaction with long chain fatty acids to esterify the hydroxy groups. Reaction with cross-linking agents such as polybasic acids, diisocyanates, and hexamethylenetetramine will yield a variety of resinous compositions. These hydroxy-containing polymers will also react with isocyanates. Valuable materials possessing surface activity can be obtained by reaction with alkylene oxides, e.g., ethylene oxide. Rubbery copolymers which have been quaternized and treated with an aldehyde may be used as gasket stocks.

As many possible embodiments may be made of this invention without departing from the scope thereof, it is to be understood that all matter herein set forth is to be interpreted as illustrative and not as unduly limiting the invention.

I claim:

1. Oil resistant rubber comprising, the reaction product of a mixture of (1) a copolymer of a conjugated diene and a compound having a structure selected from the group consisting of

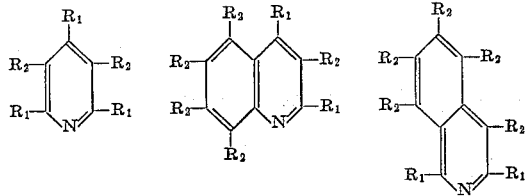

wherein at least one and not more than two of $R_1$ and $R_2$ are selected from the group consisting of vinyl and alpha-methylvinyl and at least one $R_1$ is a methyl group; (2) formaldehyde; and (3) a quaternizing agent, said formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

2. Oil resistant rubber comprising, the reaction product of a mixture of (1) a copolymer of a conjugated diene and a methylvinylpyridine containing a methyl group in at least one of the 2, 4, and 6 positions, (2) formaldehyde, and (3) a quaternizing agent, said formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

3. Oil resistant rubber comprising the reaction product of a mixture of (1) a rubbery copolymer of butadiene and 2-methyl-5-vinylpyridine, (2) formaldehyde, and (3) benzyl chloride, said formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

4. Oil resistant rubber comprising the reaction product of a mixture of (1) a rubbery copolymer of butadiene and 2-methyl-5-vinylpyridine, (2) formaldehyde, and (3) benzal chloride, said formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

5. A surface active agent comprising the reaction product of a mixture of (1) a copolymer prepared by copolymerizing a methylvinylpyridine containing a methyl group in at least one of the 2,4, and 6 positions and a conjugated diene, said diene constituting not over 20 percent by weight of the monomers charged, and (2) formaldehyde and formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

6. A surface active agent comprising the reaction product of a mixture of a homopolymer of 2-methyl-5-vinylpyridine and formaldehyde, said formaldehyde being supplied free of other materials reactable therewith, in an amount of 0.1 to 10 mols thereof per methyl group attached to each heterocyclic ring in said polymer and wherein said reaction product is made by heating the mixture at a temperature in the range of 100 to 400° F.

7. As a new composition of matter, the reaction product of a mixture of formaldehyde and a polymer of a methyl substituted heterocyclic nitrogen base selected from the group consisting of

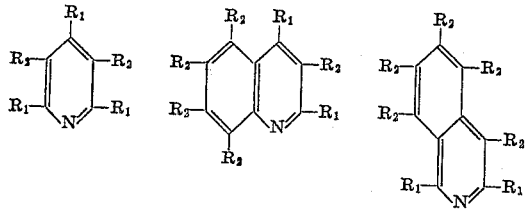

wherein at least one and not more than two of $R_1$ and $R_2$ are selected from the group consisting of vinyl and alpha-methylvinyl and at least one $R_1$ is a methyl radical, wherein at least a portion of said methyl radicals in the polymer have been converted to a radical selected from the group consisting of mono-, di-, and tri(hydroxymethyl)methyl radicals, said formaldehyde being supplied free of other materials reactable therewith, in an amount of 0.1 to 10 mols thereof per methyl group attached to each heterocyclic ring in said polymer and wherein said reaction product is made by heating the mixture at a temperature in the range of 100 to 400° F.

8. As a new composition of matter, the reaction product of a mixture of formaldehyde and a copolymer of a conjugated diene and a methylvinylpyridine wherein a methyl group is present in at least one of the 2,4, and 6 positions, said formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

9. As a new composition of matter, the reaction product of a mixture of formaldehyde and a copolymer of butadiene and 2-methyl-5-vinylpyridine, said formaldehyde being supplied free of other materials reactable therewith, in an amount of 0.1 to 10 mols thereof per methyl group attached to each heterocyclic ring in said copolymer and wherein said reaction product is made by heating the mixture at a temperature in the range of 100 to 400° F.

10. The composition of claim 9 wherein the formaldehyde is present in an amount within the range of 0.1 and 1 mol per methyl group attached to each heterocyclic ring in said copolymer.

11. A surface active agent comprising, the reaction product of a mixture of (1) a polymer of a compound having a structure selected from the group consisting of

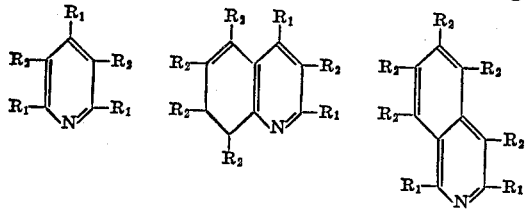

wherein at least one and not more than two of $R_1$ and $R_2$ are selected from the group consisting of vinyl and alpha-methylvinyl and at least one $R_1$ is a methyl radical, said compound comprising at least 80 percent by weight of the monomeric material polymerized to produce said polymer and (2) formaldehyde, wherein at least a portion of said methyl radicals in the polymer have been converted to a radical selected from the group consisting of mono-, di-, and tri(hydroxymethyl)methyl radicals, said formaldehyde being supplied, free of other materials reactable therewith, in an amount of 0.1 to 10 mols thereof per methyl group attached to each heterocyclic ring in said polymer and wherein said reaction product is made by heating the mixture at a temperature in the range of 100 to 400° F.

12. As a new composition of matter, the reaction product of a mixture of formaldehyde and a polymer of a methyl substituted heterocyclic nitrogen base selected from the group consisting of

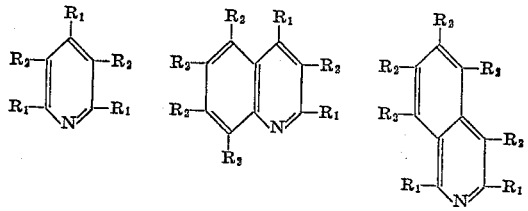

wherein at least one and not more than two of $R_1$ and $R_2$ are selected from the group consisting of vinyl and alpha-methylvinyl and at least one $R_1$ is a methyl radical, wherein at least a portion of said methyl radicals in the polymer have been converted to a radical selected from the group consisting of mono-, di-, and tri(hydroxy)methyl radicals, said formaldehyde being supplied in an amount of 0.1 to 10 mols thereof per methyl group attached to each heterocyclic ring in said polymer and wherein said reaction product is made by heating the mixture at a temperature in the range of 100 to 400° F., said formaldehyde and polymer being the sole reactants present in preparing the reaction product.

13. As a new composition of matter, the reaction product of a mixture of formaldehyde, a quaternizing agent, and a polymer of a methyl substituted heterocyclic nitrogen base selected from the group consisting of

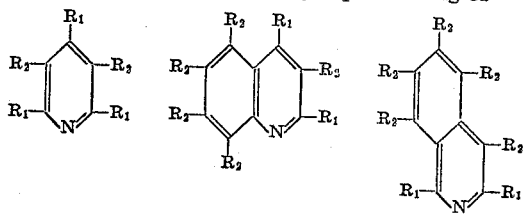

wherein at least one and not more than two of $R_1$ and $R_2$ are selected from the group consisting of vinyl and alpha-methylvinyl and at least one $R_1$ is a methyl radical, wherein at least a portion of said methyl radicals in the polymer have been converted to a radical selected from the group consisting of mono-, di-, and tri(hydroxy)-methyl radicals, said formaldehyde being supplied in an amount of 0.1 to 10 mols thereof per methyl group attached to each heterocyclic ring in said polymer and wherein said reaction product is made by heating the mixture at a temperature in the range of 100 to 400° F., said formaldehyde, quaternizing agent, and polymer being the sole reactants present in preparing the reaction product.

References Cited in the file of this patent

UNITED STATES PATENTS

| | | |
|---|---|---|
| 2,561,215 | Mighton | July 17, 1951 |
| 2,669,553 | Schaffel et al. | Feb. 16, 1954 |
| 2,702,763 | Pritchard | Feb. 22, 1955 |
| 2,739,948 | D'Alelio | Mar. 27, 1956 |

OTHER REFERENCES

Carswell: Phenoplasts, Interscience Pub., N.Y. (1947), page 19, lines 14–15, and page 9, lines 13–14.